United States Patent
Lichtinger et al.

(10) Patent No.: US 6,877,808 B2
(45) Date of Patent: Apr. 12, 2005

(54) METHOD AND APPARATUS FOR ATTACHING A SEAT SENSOR MAT TO A FOAM CUSHION

(75) Inventors: Harald Lichtinger, Auburn Hills, MI (US); Dave Talbot, Lake Orion, MI (US); KunKun Singh, Clawson, MI (US); Predrag Janic, Grand Blanc, MI (US)

(73) Assignee: Siemens VDO Automotive Corporation, Auburn HIlls, MI (US)

( * ) Notice: Subject to any disclaimer, the term of this patent is extended or adjusted under 35 U.S.C. 154(b) by 62 days.

(21) Appl. No.: 10/397,624

(22) Filed: Mar. 26, 2003

(65) Prior Publication Data

US 2003/0189362 A1 Oct. 9, 2003

Related U.S. Application Data

(60) Provisional application No. 60/370,412, filed on Apr. 5, 2002.

(51) Int. Cl.$^7$ .............................................. A47C 31/00
(52) U.S. Cl. .............................. 297/217.3; 297/452.26; 297/452.6; 340/667
(58) Field of Search .......................... 297/217.3, 180.1, 297/180.12, 452.26, 452.6; 340/667

(56) References Cited

U.S. PATENT DOCUMENTS

| | | | | | |
|---|---|---|---|---|---|
| 4,865,379 | A | * | 9/1989 | Aoki et al. | 297/180.12 |
| 4,927,209 | A | * | 5/1990 | Maruyama | 297/180.12 |
| 5,002,335 | A | * | 3/1991 | Bengtsson | 297/180.12 |
| 6,220,659 | B1 | * | 4/2001 | McDowell et al. | 297/180.12 |
| 6,428,095 | B1 | * | 8/2002 | Hirata | 297/217.3 X |
| 6,609,752 | B1 | * | 8/2003 | Inoue | 297/217.3 |
| 6,659,549 | B1 | * | 12/2003 | Still et al. | 297/217.3 X |

* cited by examiner

Primary Examiner—Anthony D. Barfield

(57) ABSTRACT

A vehicle seat assembly includes a sensor assembly that is used to provide data for an occupant classification system. The data is used to determine such characteristics as seat occupant weight and position. These characteristics are used to control deployment of a safety restraint mechanism such as an airbag. The sensor assembly is part of a mat that is placed on top of a foam cushion used to form a seat bottom. Various attachment methods can be used to permanently secure the mat to the foam cushion. Preferably, the mat includes mounting portions that are wrapped around the foam cushion to engage a bottom surface of the foam cushion. Fasteners, adhesives, hook and loop attachments, and other similar attachment members are associated with the mounting portions and are used in various combinations to secure the mat to the foam cushion.

43 Claims, 5 Drawing Sheets

METHOD AND APPARATUS FOR ATTACHING A SEAT SENSOR MAT TO A FOAM CUSHION

RELATED APPLICATION

This application claims priority to provisional application 60/370,412 filed on Apr. 5, 2002.

BACKGROUND OF THE INVENTION

This invention relates to a method and apparatus for attaching a sensor mat assembly to a vehicle seat foam cushion.

Vehicle seat assemblies often include a variety of sensors that are used to provide data concerning a seat occupant. This data can be used to derive information such as seat occupant weight and seat occupant position. This information is useful for controlling safety restraint devices such as airbags.

These seat sensors must be securely placed in the seat such that consistent and accurate data is provided. Current sensor assemblies are located in a sensor assembly mat that is placed on top of a seat cushion formed from a foam member. Strips of tape are used to secure the mat to the top surface of the foam member. Tape adhesive attachment is classified as a temporary attachment and has several disadvantages. One disadvantage is that over the course of time, as the adhesive bond degrades, the mat can move laterally and vertically with respect to the foam, which can compromise the accuracy of the data. Further, shifting of the occupant on the seat can dislodge or move the sensors out of their proper location. Another disadvantage is that the mat can be displaced during seat cushion repair. Once the sensors have been shifted, it is difficult to properly reposition the sensors.

Thus, it is desirable to have a method and apparatus for permanently attaching a sensor mat assembly to a foam cushion without the use of tape. The method and apparatus should be easy assemble and to install, and should overcome the above referenced deficiencies with prior art systems.

SUMMARY OF THE INVENTION

A sensor mat assembly is installed in a vehicle seat to provide data for an occupant classification system. The mat is attached to a foam cushion that is attached to a seat pan or similar structural member to form a seat bottom. The mat is positioned in an overlapping relationship to an upper surface of the foam cushion. Various different attachment members and methods can be used to secure the mat to the foam cushion.

In one embodiment, the mat includes a felt backing with a central portion that supports a plurality of seat sensors, and which further includes a plurality of mounting portions that extend outwardly from both sides of the central portion. Preferably, the mounting portions substantially surround raised bolster portions positioned on opposing lateral sides of the foam cushion, and extend underneath the foam cushion to engage a bottom surface of the foam cushion. The felt backing can support a hook and loop attachment interface between the mat and the foam cushion. The hook and loop attachment interface can be positioned solely at the opposing side faces of the bolsters, solely underneath the foam cushion, solely on the upper surface of the cushion, or any combination thereof.

In one disclosed embodiment, the mat is secured to the foam cushion with a first attachment member that helps align and properly position the mat relative to the foam cushion. A second attachment member is used to permanently attach the mat to the foam cushion to restrict lateral and vertical movement of the mat relative to the foam cushion. The first attachment member could be the hook and loop attachment discussed above, or another similar attachment mechanism. For example, the first attachment member could be an adhesive that is applied to one of the mat or foam cushion or a fixturing tool that cooperates with one of the foam cushion or mat to align and hold the mat and cushion fixed relative to each other before the second attachment member is applied.

The second attachment member can be one or a combination of the following types of attachment members. For example, pins, nails, rivets, or other similar male fastener members can be formed within one of the foam cushion or mat and corresponding female fastener members can be formed within the other of the foam cushion or mat, such that insertion of the male fastener members into the female fastener members provides secure attachment via an interference fit.

Optionally, the second attachment member could be one of various different types of adhesives. For example, a first member could be applied to the mat and a second member could be applied to the foam cushion wherein an adhesive force is only generated once the first and second members come into direct contact with one another. Another example includes a material that is applied to one of the mat or foam cushion wherein a triggering mechanism such as ultraviolet light or a chemical is applied to the material to generate and adhesive force. Another example includes liquid adhesive that is sprayed on either the mat or foam cushion just prior to mating of the mat on the cushion. Optionally, a heated adhesive, such as hot glue can be injected into the foam cushion.

The second attachment member could also include staples, rivets, or other similar members that are used to pierce through both the mounting portions of the mat and the foam cushion to form a permanent attachment interface.

Preferably, the second attachment members are installed via an interface between the mounting portions of the mat and the bottom surface of the foam cushion. An attachment interface that is located on the bottom surface of the foam cushion does not provide discomfort to a seat occupant seated on the seat.

These and other features of the present invention can be best understood from the following specification and drawings, the following of which is a brief description.

DETAILED DESCRIPTION OF AN EXEMPLARY EMBODIMENT

Figure 1:
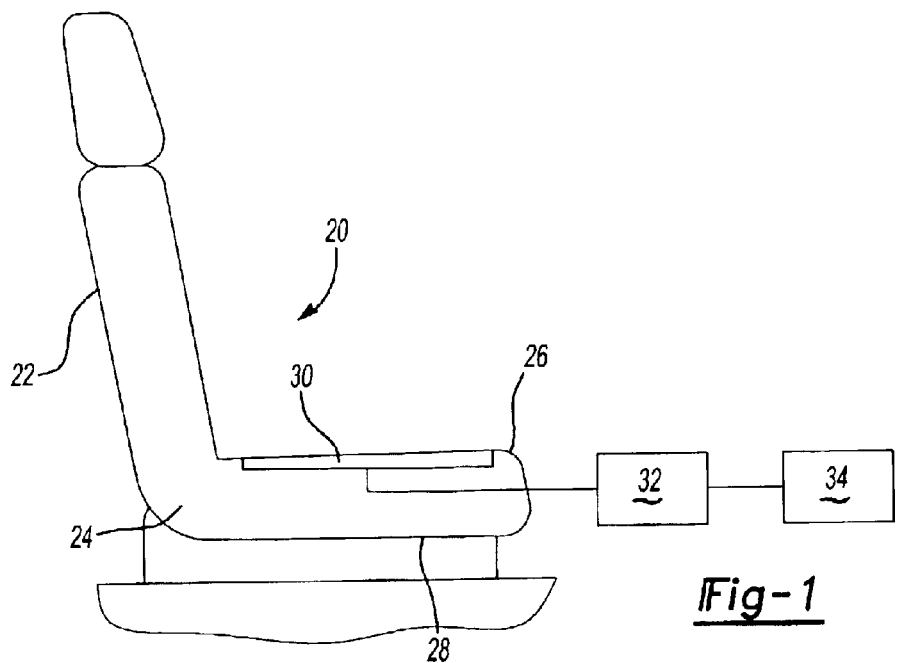
FIG. 1 is a schematic view showing a vehicle seat incorporating the subject sensor assembly for use with an occupant classification system.

A vehicle seat assembly for use with an Occupant Classification System (OCS) is shown generally at 20 in FIG. 1. The seat includes a seat back 22 and a seat bottom 24 that are preferably formed from foam cushions. The seat bottom 24 has an upper or top surface 26 and a lower or bottom surface 28. The formation of foam members for seat cushions is well known in the art and will not be discussed in detail.

A sensor mat 30, which provides data to a central computer or microprocessor 32, is positioned near the top surface 26 of the seat bottom foam member 24. The computer 32 determines characteristics such as seat occupant weight and seat occupant position from the sensor data. The computer 32 controls deployment of a safety restraint device 34, such as an airbag, based on these characteristics. For example, the airbag will be deployed only if the seat occupant weight exceeds a certain predetermined minimum weight. Additionally, the airbag will only deploy if the occupant is positioned at a predetermined distance away from the deployment area.

Figure 2:
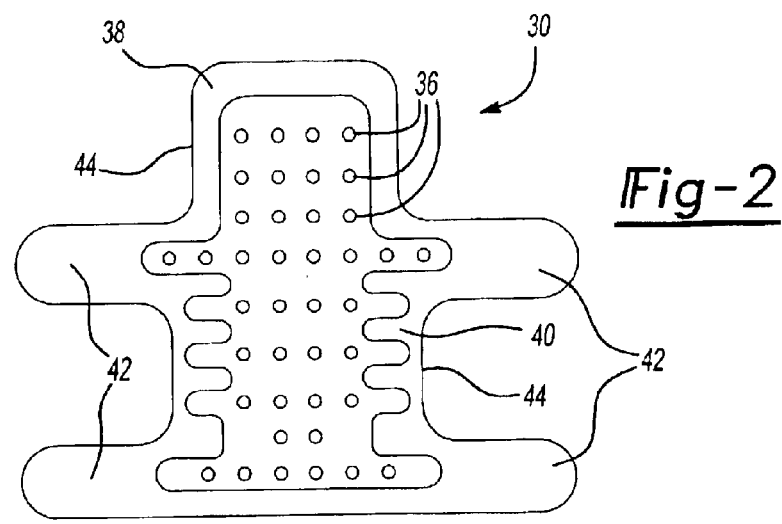
FIG. 2 is a top view of a sensor mat assembly.

The mat 30 is shown in greater detail in FIG. 2. A plurality of sensors 36 are positioned at various locations within the mat 30, as is known in the art. The mat 30 includes a backing 38 that includes a central portion 40 that supports the sensors 36, and which includes a plurality of mounting portions 42 that are formed about the circumference of the mat central portion 40. The mounting portions 42 preferably extend outwardly from opposing lateral sides 44 of the central portion 40, as shown in FIG. 2.

Figure 3:
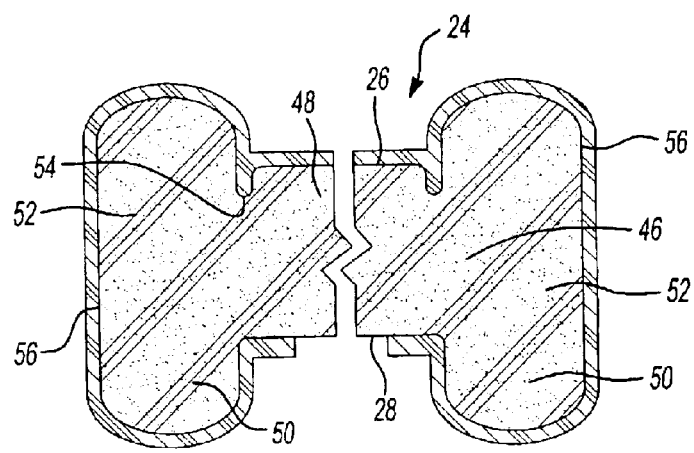
FIG. 3 is a cross-sectional view of the mat and bottom seat cushion.

As shown in FIG. 3, the seat bottom 24 is preferably formed from a foam cushion 46 that includes a generally planar center portion 48 and a pair of raised side bolsters 50 positioned on opposing laterally spaced sides 52 of the cushion 46. Trenches or troughs 54 extend longitudinally between each side bolster 50 and the center portion 48. The trenches 54 typically receive a seam or trim portion of a fabric material that is used to cover the seat cushion 46.

The mounting portions 42 of the mat 30 substantially surround the side bolsters 50. In other words, the mounting portions 42 directly engage the upper surface 26 of the bolsters 50, engage side surfaces 56 of the bolsters 50, and extend underneath the bolsters 50 to engage the lower surface 28 of the cushion 46.

Figure 4:
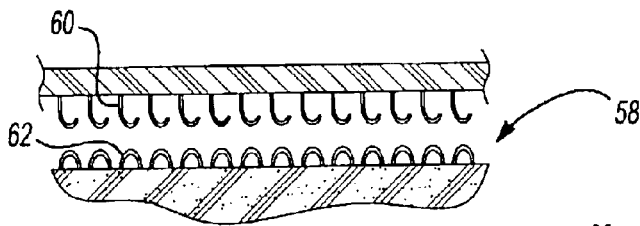
FIG. 4 is a schematic view of a hook and loop attachment.

The backing 38 is preferably formed from a cloth material such as felt or another similar material known in the art. The felt can support a hook and loop attachment, shown generally at 58 in FIG. 4, such the mat 30 and foam cushion 46 cooperate together to form a first type of attachment interface. The hook and loop attachment 58 is preferably VEL-CRO® or Micro-VELCRO®. Hooks 60 are mounted to one of the mat 30 or foam cushion 46 and loops 62 are mounted to the other of the mat or foam cushion 46. When the mat 30 and foam cushion 46 are pressed together the hooks 60 engage the loops 62 to form an attachment interface.

Micro-VELCRO®, which is compatible with felt, is preferably pre-assembled onto the foam cushion 46. The felt is then pressed in place against the Micro-VELCRO® after the mat 30 is firmly and properly located relative to the foam cushion 46 to form the attachment interface.

The hook and loop attachment 58 can be formed along the entire interface between the mat 30 and foam cushion 46, or can be positioned at discrete, predetermined positions, depending on the level of securement required. For example, the hook and loop attachment 58 can be solely formed between the mounting portions 42 and the side surfaces 56 of the bolsters 50 or can be solely formed between the mounting portions 42 and the lower surface 28 of the foam cushion 46.

Preferably, at least two different attachment interfaces are formed between the mat 30 and the foam cushion 46 to restrict lateral and vertical movement of said mat relative to said foam cushion. The first attachment interface may simply properly align and hold the mat 30 relative to the foam cushion 46 in a temporary or non-permanent attachment interface. A second attachment member is then installed to permanently secure the mat 30 to the foam cushion 46. In this situation, the first attachment interface may also remain in place, depending on the type of attachment used, or can be removed once the second attachment member is installed. Optionally, the first and second attachment interfaces cooperate together to form a permanent and secure attachment of the mat 30 to the foam cushion 46.

The hook and loop attachment 58 can be used to form the first or second attachment. In one disclosed embodiment, an adhesive material is applied to one or both of the mat 30 and foam cushion 46 prior to direct engagement between the mat 30 and foam cushion. When the mat 30 and foam cushion 46 are subsequently pressed together the adhesive forms the first attachment interface and the hook and loop attachment 58 can then subsequently be used to further secure the mat 30 to the foam cushion 46. For example, the adhesive could be applied to the upper surface 26 of the cushion 46 and the hook and loop attachment could be formed between the mounting portions 42 at the side surfaces 56 of the bolsters 50 and/or between the mounting portions 42 and the lower surface 28 of the cushion 46. Thus, the adhesive would securely hold the center body portion 40 in place and the hook and loop attachment 58 would hold the mounting portions 42 in place. The use and application of adhesives will be discussed in further detail below.

In another disclosed embodiment, a fixturing tool or other locating mechanism provides the first attachment interface by properly orientating the mat 30 and foam cushion relative to each other. The hook and loop attachment 58 is then used to secure the mat 30 to the foam cushion 46, with the fixturing tool being removed once securement is achieved. The use of fixturing tools will be discussed in further detail below.

In another disclosed embodiment, the hook and loop attachment 58 forms the first attachment interface and a subsequent fastening or joining methods are used to form the second attachment interface. The hook and loop attachment 58 and the subsequent fastening or joining operation cooperate together to provide a permanent and secure attachment to restrict lateral and vertical movement of said mat relative to said foam cushion.

FIGS. 5–24 show various different embodiments of attachment members or methods that could be used to secure the mat 30 to the foam cushion 46. As discussed above, each of these embodiments is preferably used in combination with a different type of attachment method, such as the adhesive or hook and loop attachment 58, for example. However, it should be understood that each of the embodiments could also be used alone, after the initial step of properly aligning and locating of the mat 30 and foam cushion 46 relative to each other has occurred.

Figure 5:
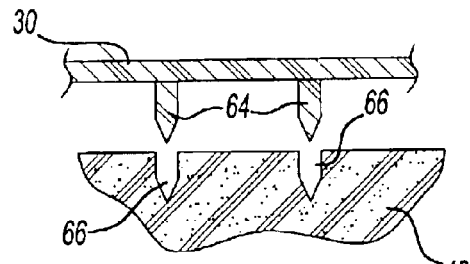
FIG. 5 is a schematic view of one attachment embodiment.

FIG. 5 shows a mat 30 with a plurality of male members 64, such as pins, nails, or similar members, and a cushion 46 with a plurality of female members 66. Each male member 64 is aligned with one female member 66. The male 64 and female 66 members are pressed together to achieve an interference fit. Preferably, the male members 64 are integrally formed with the mat 30. Optionally, the male members 64 can be pre-assembled into the mat 30.

Figure 6:
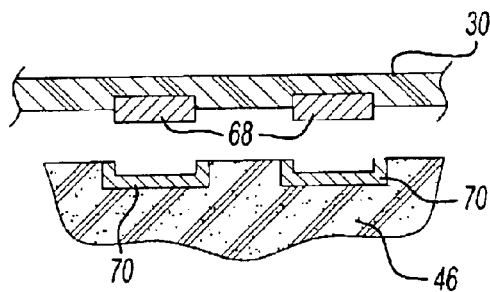
FIG. 6 is a schematic view of another attachment embodiment.

FIG. 6 shows the mat 30 with a plurality of pre-installed magnets 68 and the cushion 46 with a plurality of magnet attracting members 70. Preferably, the magnet attracting members 70 are pieces of steel that are pre-assembled into the cushion 46. The mat 30 is properly orientated to the cushion 46 such that each magnet 68 is aligned with one of the steel pieces 70. The mat 30 and cushion 46 are pressed together and the magnetic force holds them together. It should be understood that the reverse configuration could also be used wherein the steel pieces 70 are installed in the mat 30 and the magnets are installed in the cushion 46.

Figure 7:
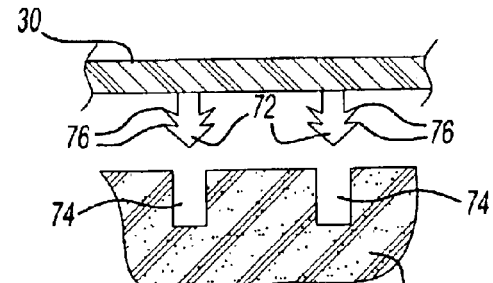
FIG. 7 is a schematic view of another attachment embodiment.

FIG. 7 shows the mat 30 with a plurality of barbed members 72 and the cushion 46 with a plurality of receiving holes 74. The barbed members 72 are integrally formed with or pre-installed in the mat 30, and include a plurality of tangs 76. When the barbed members 72 are inserted into the holes 74, the tangs grip the foam and securely hold the mat 30 in place.

Figure 8:
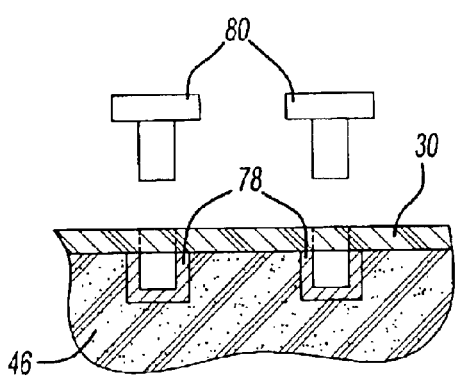
FIG. 8 is a schematic view of another attachment embodiment.

FIG. 8 shows a two-piece through foam plastic clip attachment. Receiving members 78 are formed within or pre-installed into the foam cushion 46 and fasteners 80 are snapped or popped into the receiving members 78 to secure the mat 30 to the cushion 46. The mat 30 can include pre-formed apertures through which the fasteners 80 are inserted, or the fasteners 80 can be pierced through the material and into the receiving members 78.

Figure 9:
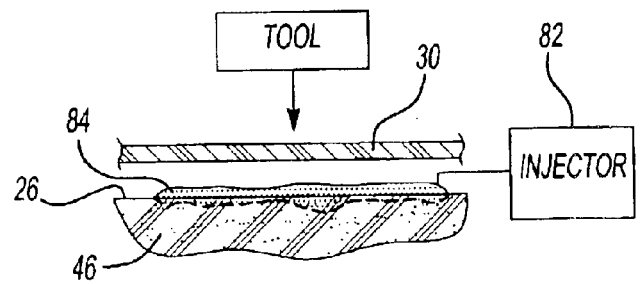
FIG. 9 is a schematic view of another attachment embodiment.

FIG. 9 shows an injector 82 that injects a hot glue or hot melt adhesive 84 into the upper surface 26 of the foam cushion 46, prior to pressing the mat 30 into place. A fixture or other similar tool device is used to positively locate the mat 30. The tool device is then removed after the mat 30 is firmly attached.

Figure 10:
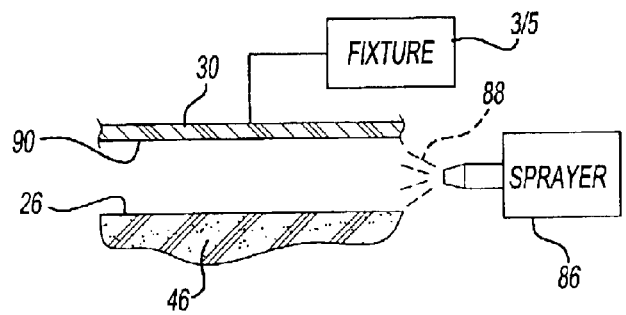
FIG. 10 is a schematic view of another attachment embodiment.

FIG. 10 shows a sprayer 86 that sprays an adhesive 88 onto either the upper surface 26 of the foam cushion 46 or a lower surface 90 of the mat 30, prior to pressing the mat 30 into place. The sprayer 86 is preferably a robotic machine that automatically sprays predetermined sections of the mat 30 or foam cushion 46. A fixture or other similar tool device 92 is used to positively locate the mat 30 prior to spraying. The tool device 92 is then removed after the mat 30 is firmly attached.

Figure 11:
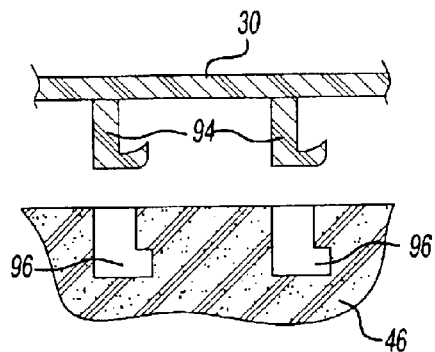
FIG. 11 is a schematic view of another attachment embodiment.

FIG. 11 shows a plurality of hooks or flaps 94 formed with the mat 30 and a plurality of slots 96 formed within the foam cushion 46. The hooks or flaps can be formed from Mylar or other similar material, and can be integrally formed with the mat 30 or preinstalled.

Figure 12:
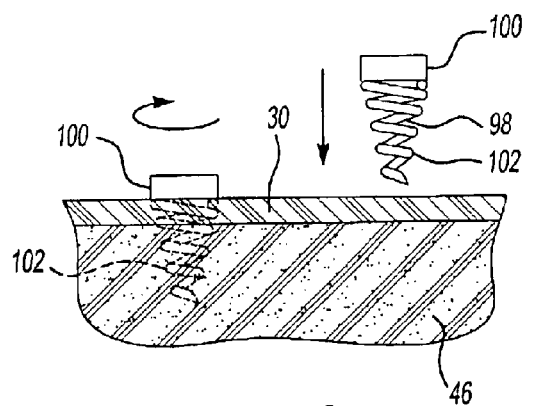
FIG. 12 is a schematic view of another attachment embodiment.

FIG. 12 shows a plurality of spring helicoils 98. The helicoils 98 include a head portion 100 and a coil spring portion 102. The helicoils are rotated or screwed through the mat 30 and into the foam cushion 46.

Figure 13:
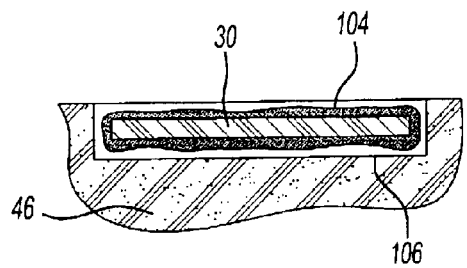
FIG. 13 is a schematic view of another attachment embodiment.

FIG. 13 shows the mat 30 enclosed within a foam pillow 104. The foam pillow 104 is then positioned within a recess 106 formed within the foam cushion 46. The foam pillow 104 and foam cushion 46 can be secured to each other by adhesive or other fastening means.

Figure 14:
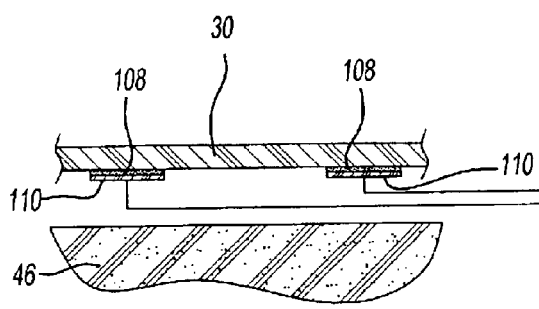
FIG. 14 is a schematic view of another attachment embodiment.

FIG. 14 shows the mat 30 having a plurality of adhesive strips 108, such as tape. The strips 108 each include a peelable layer 110 that is removed to expose the adhesive surface. Preferably, an automated mechanism 112, such as a mechanical vacuum fixture, extracts all of the peelable layers 110 in a single operation.

Figure 15:
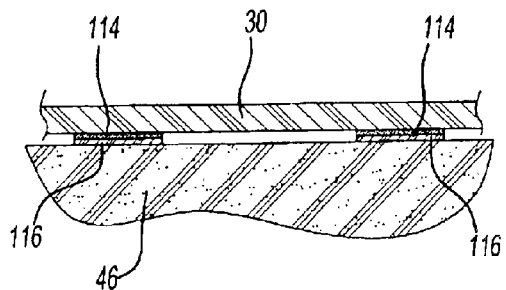
FIG. 15 is a schematic view of another attachment embodiment.

FIG. 15 shows a first adhesive member 114 mounted to the mat 30 and a second adhesive member 116 mounted to the foam cushion 46. Neither adhesive member 114, 116 presents an adhesive surface alone. An adhesive force is only generated with the first 114 and second 116 adhesive members come into direct contact with one another. The first 114 and second 116 members are formed of materials such that when they come into contact, a chemical reaction occurs to generate the adhesive force to secure the mat 30 and cushion 46 together. These materials are well know in the art and will not be discussed in further detail.

Figure 16:
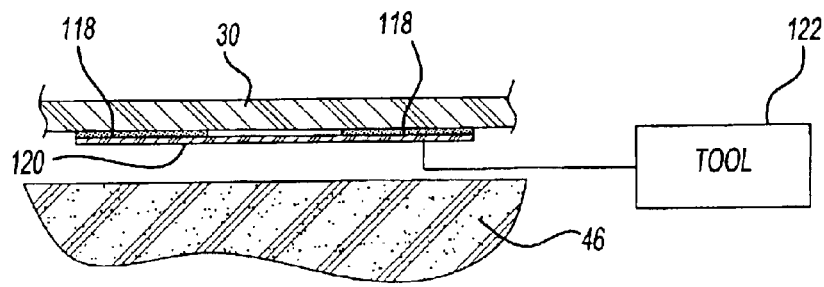
FIG. 16 is a schematic view of another attachment embodiment.

FIG. 16 shows the mat 30 having a plurality of adhesive strips 118, such as tape. The strips 118 are all covered by the same peelable layer 120, which is removed to expose the adhesive surface. Preferably, an automated mechanism 122 extracts the single peelable layer 120 to simultaneously expose the adhesive surface of each strip 118.

Figure 17:
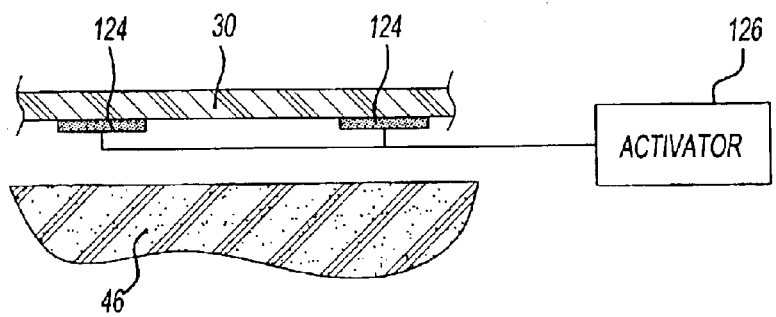
FIG. 17 is a schematic view of another attachment embodiment.

FIG. 17 shows a first reactive material 124 attached to the mat. Initially, the material 124 does not have an adhesive surface. A triggering or activator mechanism 126, such as application of ultraviolet light or application of a chemical material, cooperates with the reactive material 124 just prior to the mat 30 and foam cushion 46 being pressed together. Once the triggering mechanism 126 has been activated, the reactive material 124 generates an adhesive surface to secure the mat 30 to the foam cushion 46.

Figure 18:
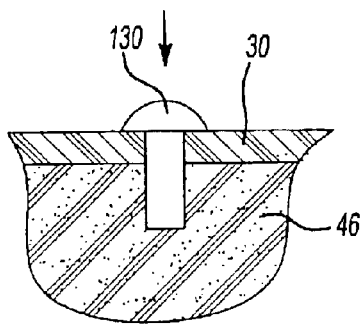
FIG. 18 is a schematic view of another attachment embodiment.

FIG. 18 shows a fastener 130, such as a rivet, that is punched through the mat 30 and into the foam cushion 46.

A rivet gun (not show) is used to generate the insertion force necessary to penetrate both the mat 30 and the foam. Preferably, a plurality of rivets 130 is used to provide secure attachment.

Figure 19:
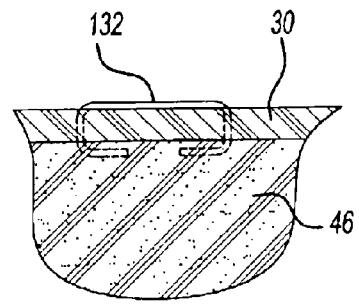
FIG. 19 is a schematic view of another attachment embodiment.

FIG. 19 shows a staple 132 that is used to penetrate the mat 30 and foam cushion 46. An automated staple gun or other similar stapling device can be used to insert and crimp the staple 132. In the preferred embodiment, a plurality of staples 132 are inserted through mounting portions 42 to engage sides of the bolsters 50.

Figure 20:
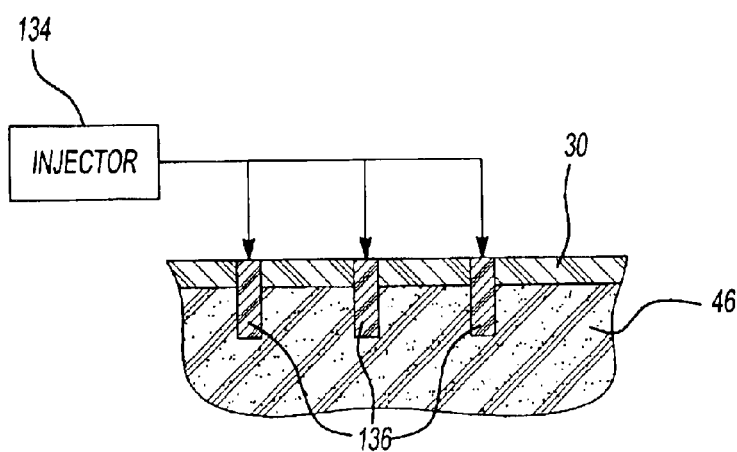
FIG. 20 is a schematic view of another attachment embodiment.

The embodiment of FIG. 20 utilizes a liquid fastener attachment. An injector or other similar tool 134 injects a plastic fastener material 136, similar to a liquid nail material, through the mat 30 and into the foam cushion 46. The fastener material 136 hardens to securely attach the mat 30 to the foam cushion.

Figure 21:
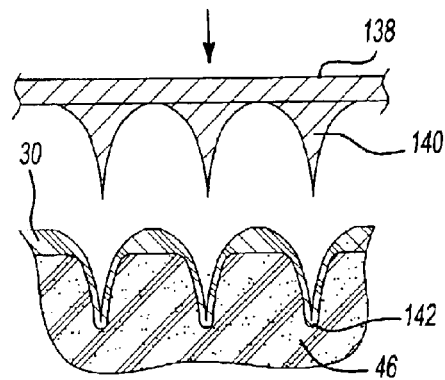
FIG. 21 is a schematic view of another attachment embodiment.

The embodiment of FIG. 21 utilizes a piercing machine element 138 having a plurality of pointed teeth 140 to attach the mat 30 to the cushion 46. The teeth 140 force portions 142 of material from the mat 30 to penetrate into the foam of the cushion 46.

Figure 22:
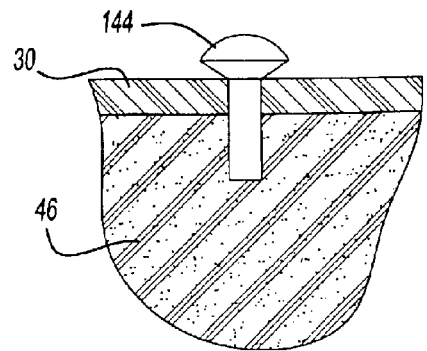
FIG. 22 is a schematic view of another attachment embodiment.

The embodiment of FIG. 22 utilizes a removable service pin 144. The pin 144 is put in place to hold the mat 30 and cushion 46 together through the handling process. The pin 144 is preferably removed just prior to a seat trimming operation. The removable pin 144 thus serves as an initial attachment/locating feature and does not serve as a permanent attachment interface. The pin 144 can be used in combination with any of the embodiments described above.

Figure 23A:
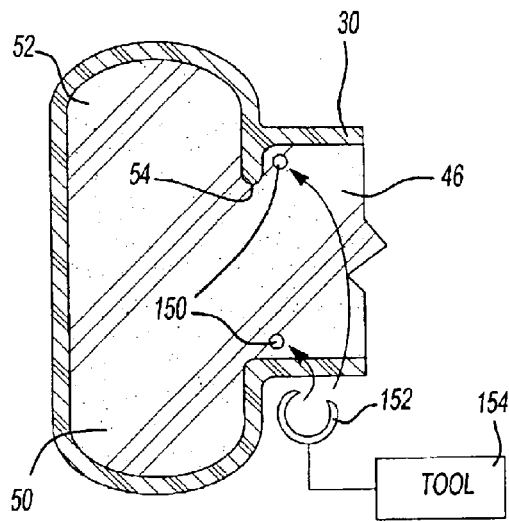
FIG. 23A is a schematic view of another attachment embodiment, in an uninstalled position.
Figure 23B:
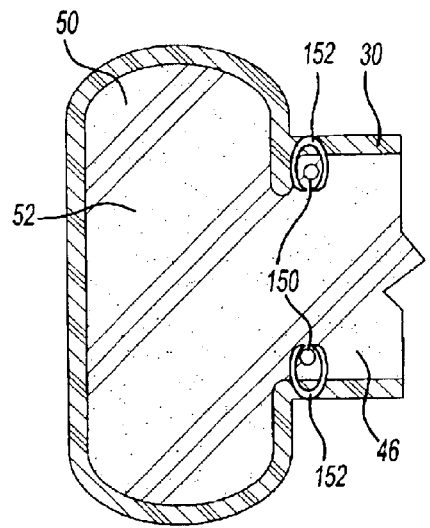
FIG. 23B is a schematic view of the attachment embodiment of FIG. 23A, shown in the installed position.

The embodiment of FIGS. 23A and 23B utilizes a hog ring attachment to secure the mat 30 to the cushion 46. Wires 150 are installed within the foam cushion 46 and are positioned to be parallel to the longitudinally extending seat trenches 54. Preferably, a lower wire 150 and an upper wire are installed on both lateral sides 52 of the cushion 46, for a total of four (4) wires 150 (only 2 (two) are shown). A plurality of hog rings 152 are used to penetrate the mat 30, pierce the foam, and surround the wires 150. A hog ring tool 154 inserts the hog rings 152 and crimps or bends the rings 152 from their initial C-shaped form, shown in FIG. 23A to their final ring-shaped form, shown in FIG. 23B. Preferably, the upper hog rings 152 are inserted through the trenches 54 such that a seat occupant will not experience discomfort.

Figure 24:
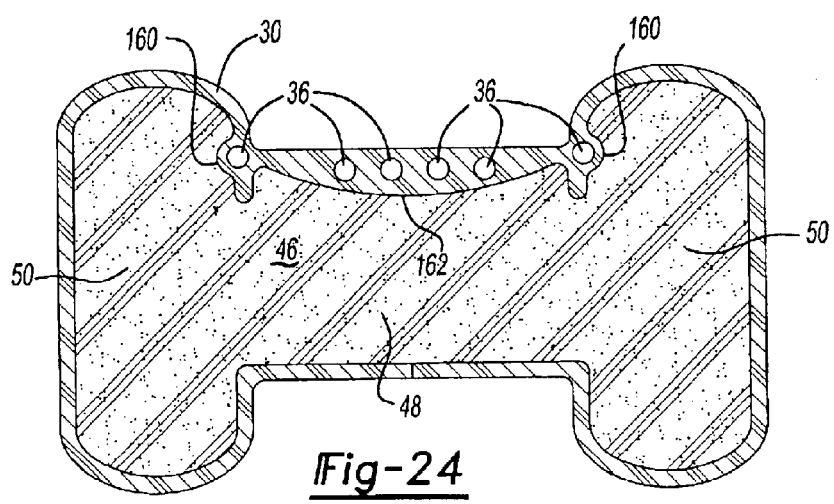
FIG. 24 is a schematic view of another attachment embodiment.

In the embodiment shown in FIG. 24, the foam cushion 46 includes pocket portions 160 formed within the raised side bolsters 50 to receive sensors 36 that are overlaid on the bolsters. In addition to, or optionally, the cushion 46 can include a clamshell pocket 162 in the center portion 48 to receive the main portion of the seat sensors 36. These pocket configurations can be used in combination with any of the attachment embodiments described above.

Further, it should be understood that each of the embodiments described above can be formed along the entire interface between the mat 30 and foam cushion 46, or can be positioned at discrete, predetermined positions depending on the level of securement required. For example, the adhesive attachments and hook and loop attachments can be formed along a significant portion of the mat and cushion interface, can be solely formed between the mounting portions 42 and the side surfaces 56 of the bolsters 50, or can be solely formed between the mounting portions 42 and the lower surface 28 of the foam cushion 46. Preferably, the fastener attachments that include pins, rivets, magnets, barbed members, hooks, flaps, etc. are associated with the mounting portions and are located on either the side surfaces 56 of the bolsters 50 or underneath the cushion 46 so that an occupant seated on the seat does not experience discomfort.

This method provides a simplified and economical apparatus for permanently attaching a sensor mat to a foam seat cushion. The attachment method restricts lateral and vertical movement of the mat relative to the foam, which results in improved consistency and accuracy for the sensors over the life of the vehicle.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A sensor assembly for a vehicle seat comprising:

a foam cushion having a center portion with a pair of raised bolster portions extending along opposite lateral sides of said center portion;

a mat including a plurality of sensors secured to a base material portion, said base material portion including a central section positioned in an overlapping relationship to said center portion of said foam cushion and a plurality of mounting portions extending outwardly from both lateral sides of said central section;

a first attachment member associated with at least one of said foam cushion or mat and cooperating with the other of said foam cushion or mat to establish an initial alignment of said mat to said foam cushion; and a second attachment member associated with at least one of said foam cushion or mat and cooperating with the other of said foam cushion or mat to permanently attach said mat to said foam cushion and restrict lateral and vertical movement of said mat relative to said foam cushion.

2. An assembly as set forth in claim 1 wherein said foam cushion has an upper surface and a lower surface and wherein said mounting portions substantially surround both of said bolster portions by extending from said upper surface, over both of said raised bolster portions, and underneath said foam cushion to engage said lower surface.

3. An assembly as set forth in claim 1 wherein said mat has an upper surface and a lower surface and wherein said first attachment member comprises a hook and loop attachment associated with said bottom surface of said mat and cooperating with an outer surface of said foam cushion to secure said mat to said foam cushion.

4. An assembly as set forth in claim 1 wherein said second attachment member comprises an adhesive applied to at least one of said mat or said foam cushion.

5. An assembly as set forth in claim 4 wherein said first attachment member comprises a fixture member that positively locates said mat in an overlapping relationship to said foam cushion prior to application of said adhesive.

6. An assembly as set forth in claim 5 wherein said adhesive comprises liquid adhesive sprayable on a lower surface of said mat or an upper surface of said foam cushion prior to engagement between said mat and said foam cushion.

7. An assembly as set forth in claim 5 wherein said adhesive comprises a heated glue injected into said foam cushion prior to engagement between said mat and said foam cushion.

8. An assembly as set forth in claim 5 where in said adhesive comprises a plurality of tape strips positioned at predetermined locations on said mat or said foam cushion, each of said tape strips having a peelable portion that exposes an adhesive surface when removed, and including a vacuum fixture for simultaneously removing all peelable portions prior to engagement between said mat and said foam cushion.

9. An assembly as set forth in claim 5 wherein said adhesive comprises a first member associated with said mat and a second member associated with said foam cushion and wherein an adhesive force is only generated when said first and second members are in direct contact with each other.

10. An assembly as set forth in claim 5 wherein said adhesive comprises a plurality of tape strips spaced apart from one another and positioned at predetermined locations on said mat or said foam cushion and including a single peelable portion common to all of said tape strips such that removal of said single peelable portion exposes all adhesive surfaces of said tape strips.

11. An assembly as set forth in claim 5 wherein said adhesive is comprised of an initially non-adhesive material and wherein an adhesive force is only generated when a triggering mechanism is applied to said initially non-adhesive material.

12. An assembly as set forth in claim 1 wherein said second attachment member comprises a plurality of staples inserted through said mounting portions and into said foam cushion.

13. An assembly as set forth in claim 1 wherein said second attachment member comprises a plurality of rivets inserted through said mounting portions and into said foam cushion.

14. An assembly as set forth in claim 1 wherein said second attachment member comprises liquid nail material injected into said foam cushion.

15. An assembly as set forth in claim 1 wherein said second attachment member comprises a fixturing tool for piercing material at plurality of different locations within said mounting portions into said foam cushion in an interference fit.

16. An assembly as set forth in claim 1 wherein said second attachment member comprises a hook and loop attachment interface located only on outwardly facing sides of said bolsters portions.

17. An assembly as set forth in claim 1 wherein said second attachment member comprises a two-piece fastener attachment with a female piece molded within said foam cushion and a male piece fixed to said mat.

18. An assembly as set forth in claim 1 wherein said second attachment member comprises at least one wire molded within said foam cushion generally parallel to said raised bolster portions and a plurality of hog rings inserted through said mounting portions to surround said wire and prevent detachment of said mat from said foam cushion.

19. An assembly as set forth in claim 1 wherein said base material portion comprises a foam pillow, said first attachment member comprises a fixturing tool that aligns said foam pillow with said center portion of said foam cushion, and said second attachment member comprises an adhesive applied between said foam pillow and said foam cushion.

20. An assembly as set forth in claim 1 wherein said second attachment member comprises a plurality of male members integrally formed with said base material portion of said mat and a corresponding plurality of female members formed within said foam cushion and wherein said male members are received within said female member in an interference fit to secure said mat to said foam cushion.

21. An assembly as set forth in claim 1 wherein said second attachment member comprises a plurality of magnets installed within one of said mat or said foam cushion and a magnet attracting material formed within the other of said mat or foam cushion.

22. An assembly as set forth in claim 1 wherein said foam cushion has an upper surface and a lower surface and wherein said central section of said mat is overlaid on top of said upper surface of said center portion of said foam cushion with said plurality of sensors being located in said central section of said mat.

23. An assembly as set forth in claim 22 wherein said plurality of mounting portions extends from said upper surface, around external side surfaces of said pair of raised bolster portions, and underneath said foam cushion with said plurality of mounting portions being directly fixed to said lower surface of said foam cushion.

24. A sensor assembly for a vehicle seat comprising:
a foam cushion having a center portion with a pair of raised bolster portions extending along opposite lateral sides of said center portion;
a mat including a plurality of sensors secured to a base material portion, said base material portion including a central section positioned in an overlapping relationship to said center portion of said foam cushion and a plurality of mounting portions extending outwardly from both lateral sides of said central section and substantially surrounding said bolster portions;
an attachment member associated with at least one of said foam cushion or mat and cooperating with the other of said foam cushion or mat to permanently attach said mat to said foam cushion and restrict lateral and vertical movement of said mat relative to said foam cushion.

25. A sensor assembly as set forth in claim 24 wherein attachment member comprises a hook and loop attachment between said mat and said foam cushion.

26. A sensor assembly as set forth in claim 25 wherein said hook and loop attachment comprises a first attachment interface and wherein said attachment member further includes a second attachment member that cooperates with said first attachment interface to securely attach said mat to said foam cushion.

27. A sensor assembly as set forth in claim 26 wherein said second attachment member comprises an adhesive applied to at least one of said mat or said foam cushion.

28. A sensor assembly as set forth in claim 26 wherein said second attachment member comprises a plurality of male members integrally formed with said base material portion of said mat and a corresponding plurality of female members formed within said foam cushion and wherein said male members are received within said female member in an interference fit to secure said mat to said foam cushion.

29. A sensor assembly as set forth in claim 26 wherein said second attachment member comprises a plurality of fasteners extending through said mounting portions and into said foam cushion.

30. A sensor assembly as set forth in claim 25 wherein said hook and loop attachment is only located on outwardly facing side edges of said bolster portions.

31. A sensor assembly as set forth in claim 25 wherein said hook and loop attachment is only located at a bottom surface of said foam cushion.

32. A sensor assembly as set forth in claim 24 wherein said base material portion comprises a felt material and said attachment member comprises an adhesive.

33. A sensor assembly as set forth in claim 24 wherein said attachment member comprises a plurality of male members integrally formed with said mounting portions of said mat and a corresponding plurality of female members formed within a bottom surface of said foam cushion and wherein said male members are received within said female member in an interference fit underneath said foam cushion to secure said mat to said foam cushion.

34. A sensor assembly as set forth in claim 24 wherein said foam cushion has an upper surface and a lower surface and wherein said central section of said mat is overlaid on top of said upper surface of said center portion of said foam cushion with said plurality of sensors being located in said central section of said mat and said plurality of mounting portions extending from said upper surface and around external side surfaces of said pair of raised bolster portions, said plurality of mounting portions being directly fixed to said lower surface of said foam cushion.

35. A sensor assembly as set forth in claim 33 wherein said attachment member comprises at least one wire molded within said foam cushion generally parallel to said raised bolster portions and a plurality of hog rings inserted through said mounting portions and crimped to surround said wire and prevent detachment of said mat from said foam cushion.

36. A method for attaching a sensor mat to a foam seat cushion having a top surface and a bottom surface comprising the steps of:
  (a) placing the mat on the top surface of the foam seat cushion;
  (b) wrapping mounting portions of the mat to substantially surround raised bolster portions positioned on opposing lateral sides of the foam seat cushion; and
  (c) attaching the mounting portions to a bottom surface of the foam seat cushion with an attachment member.

37. A method as set forth in claim 36 wherein step (c) includes inserting a plurality of hooks formed on one of the mat or foam seat cushion into a plurality of loops formed on the other of the mat or foam seat cushion to form a first attachment interface.

38. A method as set forth in claim 37 including the step of
  (d) attaching the mounting portions to a bottom surface of the foam seat cushion with a second attachment member.

39. A method as set forth in claim 38 wherein step (d) includes forming a plurality of male members on one of the mat or foam seat cushion, forming a plurality of female members on the other of the mat or foam seat cushion, and inserting the male members into corresponding female members to achieve an interference fit.

40. A method as set forth in claim 38 wherein step (d) includes applying an adhesive to one of the foam seat cushion or mat prior to step (b).

41. A method as set forth in claim 38 wherein step (d) includes molding at least one wire within the foam seat cushion in an orientation parallel to the raised bolster portion, piercing the mounting portions with a plurality of hog rings, and crimping the hog rings to substantially surround the wire.

42. A method as set forth in claim 36 wherein step (a) includes positioning a plurality of sensors in a central section of the mat and forming the mounting portions about a perimeter of the mat.

43. A method as set forth in claim 42 wherein step (a) includes overlaying the central section of the mat on top of the top surface of the foam seat cushion.

* * * * *